United States Patent [19]

So

[11] Patent Number: 5,137,351
[45] Date of Patent: Aug. 11, 1992

[54] OPTICAL TIME DOMAIN REFLECTOMETER FOR SELECTIVE TESTING OF OPTICAL FIBERS WITH DIFFERENT CORE DIAMETERS

[76] Inventor: Vincent C. Y. So, 66 Fardon Way, Ottawa, Ontario, Canada, K1G 4N7

[21] Appl. No.: 735,215

[22] Filed: Jul. 24, 1991

[51] Int. Cl.$^5$ .................. G01N 21/88; G01N 21/59
[52] U.S. Cl. .................................................. 356/73.1
[58] Field of Search ....................................... 356/73.1

[56] References Cited

U.S. PATENT DOCUMENTS

| | | | |
|---|---|---|---|
| 4,737,026 | 4/1988 | Dalgoutte et al. | 356/73.1 |
| 4,737,027 | 4/1988 | Maeda | 356/73.1 |
| 4,875,772 | 10/1989 | Gentile | 356/73.1 |
| 4,932,742 | 6/1990 | Tohme | 350/96.18 |
| 5,067,810 | 11/1991 | Bu-Abbud | 356/73.1 |

OTHER PUBLICATIONS

"WM4 A 0.3-dB single mode fiber switch" by Harold A. Roberts and Robert A. Eno, Optical Fiber Conference, 1990.

Primary Examiner—Vincent P. McGraw

[57] ABSTRACT

An OTDR includes an optical source, an optical detector, and two optical fiber connectors respectively for connection of a single mode fiber or a multi-mode fiber to be tested. Optical paths selectively couple either the source to the first connector and the first connector to the detector, or the source to the second connector and the second connector to the detector. The path from the source to the first connector consists of single-mode fiber, the path from the second connector to the detector consists of multi-mode fiber, and the paths from the first connector to the detector and from the source to the second connector each consist of single mode fiber followed by multi-mode fiber. The selective coupling is achieved using an optical switch and two optical couplers.

11 Claims, 2 Drawing Sheets

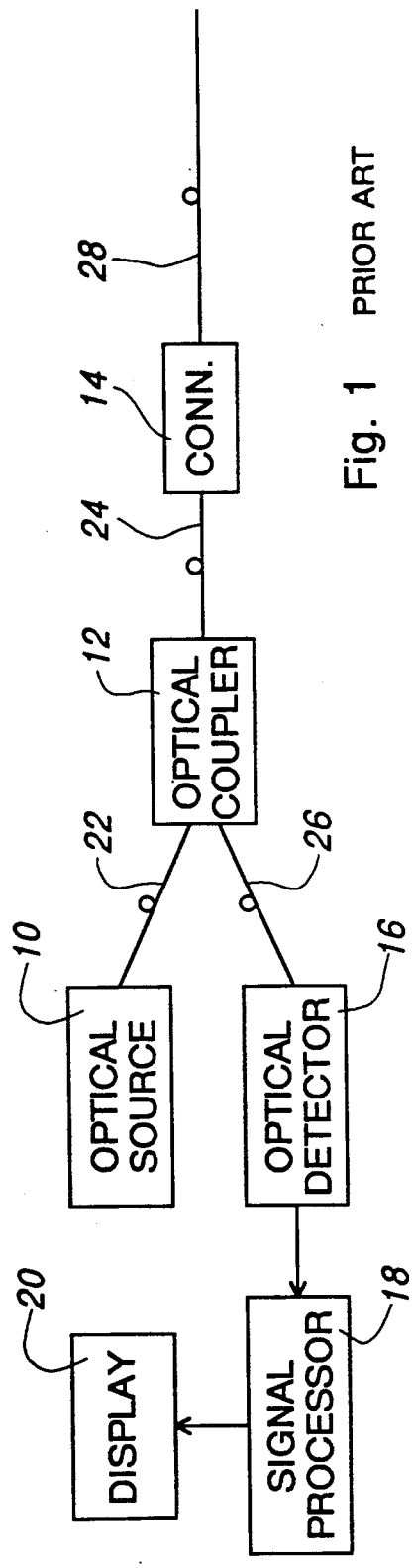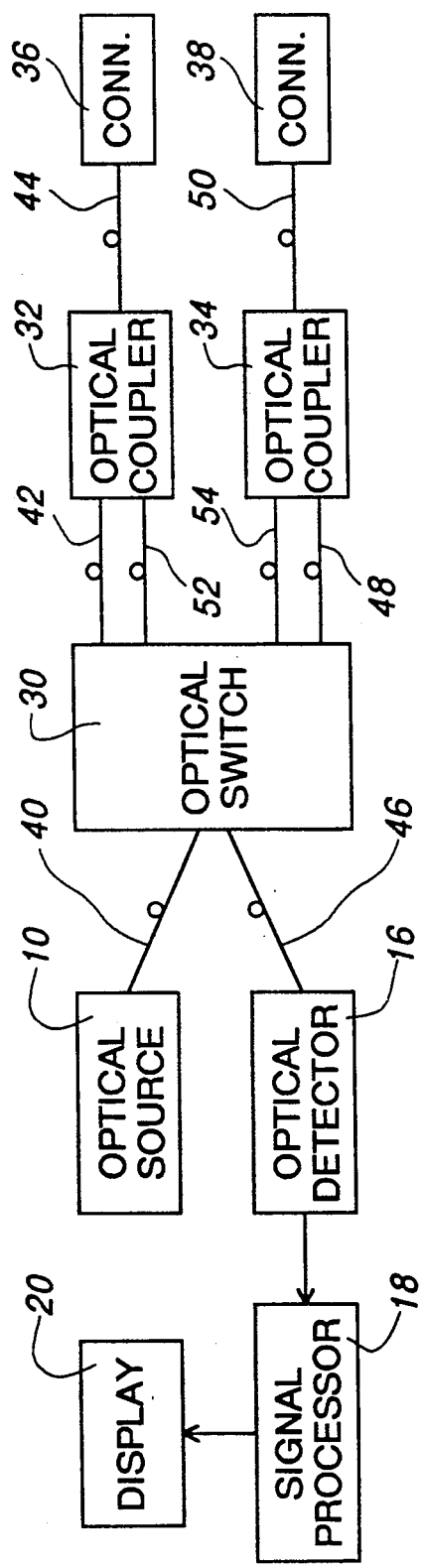

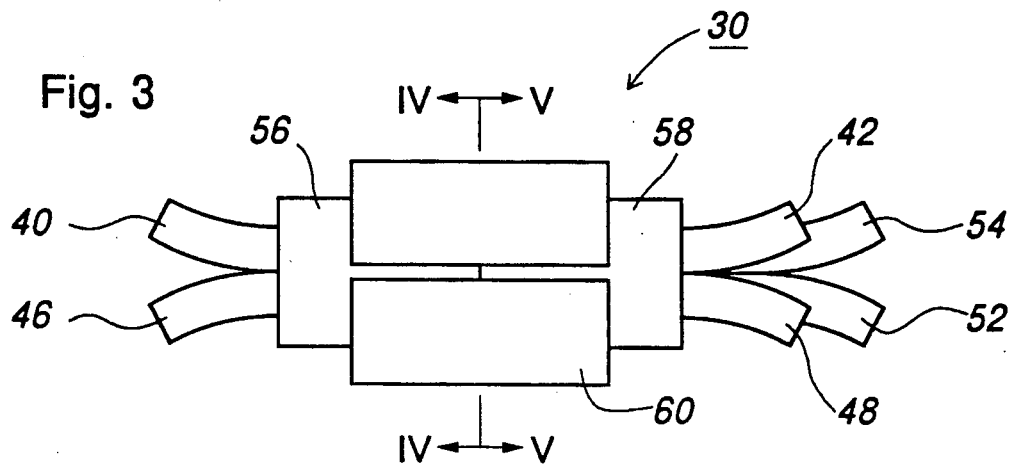
Fig. 3
Fig. 4
Fig. 5
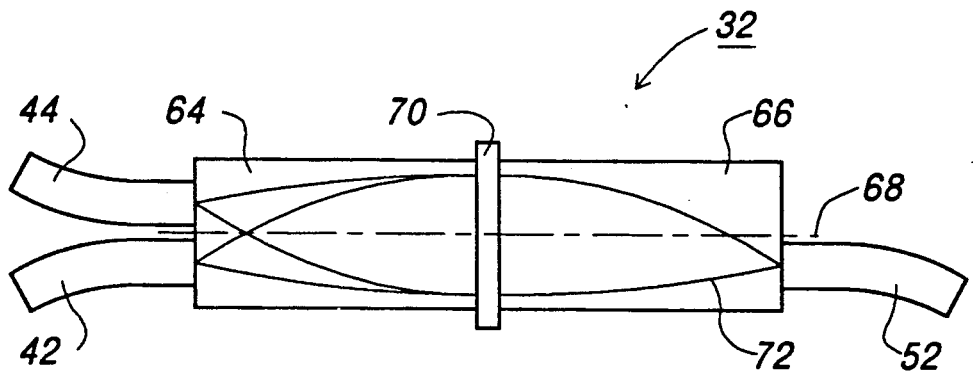
Fig. 6

OPTICAL TIME DOMAIN REFLECTOMETER FOR SELECTIVE TESTING OF OPTICAL FIBERS WITH DIFFERENT CORE DIAMETERS

This invention relates to an optical time domain reflectometer, or OTDR, which is used for determining characteristics of an optical fiber in an optical communications system.

BACKGROUND OF THE INVENTION

It is well known to use an OTDR to determine or monitor loss characteristics of an optical fiber in an optical communications system. With increasing use of optical communications over both long and short distances, and with extension of optical fiber communications to subscribers' premises and local area networks, there is an increasing need for such monitoring in a convenient and effective manner.

Optical fibers which are currently used in optical communications systems are either single mode or multi-mode fibers. With single mode fibers, one mode ($LP_{01}$) is propagated over large distances with relatively little attenuation or loss, whereas other, higher order, modes are heavily attenuated over such distances. Accordingly, single mode fibers are used for relatively long optical fiber communications paths, for which low attenuation and low dispersion of the optical signal are required. Multi-mode fibers, in which a number of different modes are simultaneously propagated along the fiber, tend to be used for relatively short optical fiber communications paths, for example in optical fiber local area networks (LANs), where they provide advantages such as lower costs and easier splicing due to their larger core size.

As is well known, in an OTDR light from an optical source such as a laser diode is coupled to a fiber to be tested, and light reflected back via the fiber (back-scattered light) is detected to provide a display of fiber attenuation characteristics along the length of the fiber. By way of example, Maeda U.S. Pat. No. 4,737,027 issued Apr. 12, 1988 and entitled "Optical Fiber Measuring Apparatus" illustrates such an OTDR arrangement using lenses for coupling the light between laser diodes, detector, and a connector for the fiber. In practice, such a lens system is difficult to implement, and accordingly it is normal to use optical fibers for communicating the optical signals among the components of the OTDR. For example, Dalgoutte et al. U.S. Pat. No. 4,737,026 issued Apr. 12, 1988 and entitled "Plural Wavelength Optical Fibre Reflectometer" describes an OTDR for single mode fiber in which single mode fibers are used to couple light from laser diodes to an optical coupler and thence to a fiber to be tested, and from the coupler to a detector.

Such an OTDR, designed for testing single mode fibers and therefore itself including single mode fibers, is not suitable for testing of multi-mode fibers because this would involve a junction, at the connector for the fiber to be tested, between the single mode fiber of the OTDR and the multi-mode fiber to be tested. Although light would be propagated from the OTDR to the multi-mode fiber with relatively low loss, in the reverse direction the back-scattered light to be detected would suffer a large attenuation, typically greater than 10 dB in passing from the multi-mode fiber to be tested to the single mode fiber of the OTDR. This large attenuation is due to the mismatch between the mode fields and numerical apertures of the two types of fiber, it being understood that the core diameter of the single mode fiber is typically 9 μm, whereas the core diameter of the multi-mode fiber is in a range of about 50 to 100 μm, typical core diameters for multi-mode fibers for communications applications being 50 μm and 62.5 μm. Accordingly, for testing multi-mode fibers it is necessary to provide an OTDR which itself uses multi-mode fibers for optical communications among its components.

Conversely, a multi-mode OTDR can not be used for testing single mode fibers, because again this would involve a junction at the connector of the OTDR between fibers of the two types, and consequently an excessive loss in propagating an optical signal from the multi-mode fiber of the OTDR into the single mode fiber to be tested.

It is therefore increasingly necessary for craftspersons to carry two distinct OTDRs, for testing single mode and multi-mode fibers respectively. This is inconvenient and expensive. In order to reduce these disadvantages, an OTDR may be provided with two separate plug-in optical units, for testing single mode and multi-mode fibers respectively, with a common signal processing and display unit. However, the disadvantages of inconvenience and expense remain.

An object of this invention, therefore, is to provide an improved OTDR which facilitates testing of either single mode and multi-mode fibers.

SUMMARY OF THE INVENTION

According to one aspect of this invention there is provided an optical time domain reflectometer (OTDR) comprising: a first, single mode, fiber coupled to the optical source; a second, multi-mode, fiber coupled to the optical detector; a first connector, for connection of a single mode optical fiber to be tested, having a third, single mode fiber coupled thereto; a second connector, for connection of a multi-mode optical fiber to be tested, having a fourth, multi-mode fiber coupled thereto; and means for selectively coupling the third or the fourth fiber to both of the first and second fibers.

Such an OTDR enables the optical source and the optical detector to be coupled to either a single mode or a multi-mode fiber to be tested, without requiring any transmission of an optical signal from a multi-mode fiber to a single mode fiber, which transmission would suffer from undue attenuation as described above.

The means for selectively coupling the third or the fourth fiber to both of the first and second fibers preferably comprises: a first optical coupler coupling both a fifth, single mode, fiber and a sixth optical fiber to the third fiber; a second optical coupler coupling both a seventh optical fiber and an eighth, multi-mode, fiber to the fourth fiber; and an optical switch for selectively coupling either the first fiber to the fifth fiber and the second fiber to the sixth fiber, or the first fiber to the seventh fiber and the second fiber to the eighth fiber.

The sixth fiber can comprise a single mode fiber and the first optical coupler can comprise a fused fiber coupler, whereas the seventh fiber can comprise a multi-mode fiber and the second optical coupler can comprise a fused fiber coupler. Alternatively, the first or second optical coupler can comprise two graded index lenses aligned with one another on a common axis and a half-mirror therebetween, the graded index lenses focussing light reflected by the half-mirror between two off-axis fibers at an outer end of one lens and focussing light transmitted by the half-mirror between one of the two off-axis fibers and another off-axis fiber at an outer end of the other of the two graded index lenses.

Preferably the optical switch comprises a first ferrule having the fifth to eighth fibers therein and a second ferrule having the first and second fibers therein, the ferrules being coaxially aligned and rotatable with respect to one another to provide the selective coupling of the fibers.

Although the invention is particularly applicable for providing a single OTDR for testing both single mode and multi-mode fibers, it is generally applicable for providing a single OTDR for testing fibers with different core diameters. Thus the principles of the invention are equally applicable to the testing of multi-mode fibers with different core diameters, for example 50 μm and 62.5 μm, the OTDR having a respective connector for fibers of each core diameter, and with the coupling of light via fibers between the connectors, optical source, optical detector, and optical switch being such that there is no coupling from any fiber to another fiber of smaller core diameter, and hence no excessive attenuation which would be associated with such coupling.

Furthermore, although only two connectors are referred to here, the OTDR may include further optical fiber connectors for fibers with other core diameters, provided in a similar manner with a correspondingly increased number of positions of the optical switch.

Thus according to another aspect this invention provides an optical time domain reflectometer (OTDR) for selectively testing optical fibers with different core diameters, comprising: an optical source, an optical detector, and two optical fiber connectors respectively for connection of a fiber having a first core diameter or a fiber having a second core diameter, the second core diameter being greater than the first core diameter; and optical paths selectively coupling either the optical source to the first connector and the first connector to the optical detector, or the optical source to the second connector and the second connector to the optical detector; wherein the optical path from the optical source to the first connector consists of optical fiber having the first core diameter, the optical path from the second connector to the optical detector consists of optical fiber having the second core diameter, and the optical paths from the first connector to the optical detector and from the optical source to the second connector each consist of optical fiber having the first core diameter followed by optical fiber having the second core diameter.

The first and second core diameters can for example be 9 μm and at least about 50 μm for single mode and multi-mode fibers respectively, or they can for example be 50 μm and 62.5 μm for multi-mode fibers with different core diameters.

According to a further aspect this invention provides a method of using an optical time domain reflectometer (OTDR) for selectively testing single mode or multi-mode optical fibers, comprising the steps of: connecting either a single mode fiber to be tested to a first connector or a multi-mode fiber to be tested to a second connector; and selectively coupling an optical source and an optical detector to the first connector or the second connector respectively; wherein the selective coupling of the optical source to the first connector is via single-mode optical fiber, the selective coupling of the second connector to the optical detector is via multi-mode optical fiber, and the selective coupling of the first connector to the optical detector or the optical source to the second connector is via single mode optical fiber followed by multi-mode optical fiber.

BRIEF DESCRIPTION OF THE DRAWINGS

The invention will be further understood from the following description with reference to the accompanying drawings, in which the same references are used in different figures to denote similar elements and in which:

FIG. 1 is a block diagram illustrating a known form of OTDR;

FIG. 2 is a block diagram illustrating an OTDR in accordance with an embodiment of this invention;

FIG. 3 illustrates an optical switch of the OTDR of FIG. 2;

FIGS. 4 and 5 are sectional illustrations of the optical switch, the sections being taken on and looking in the directions of lines IV—IV and V—V respectively in FIG. 3; and FIG. 6 schematically illustrates an optical coupler of the OTDR of FIG. 2.

DESCRIPTION OF THE PREFERRED EMBODIMENT

Referring to FIG. 1, a known form of OTDR is illustrated. The OTDR comprises an optical source 10, such as a laser diode, an optical coupler 12, a connector 14 for an optical fiber to be tested, an optical detector 16 such as a photodiode, a signal processor 18, and a display 20. Light from the optical source 10 is coupled via an optical fiber 22, the coupler 12, and an optical fiber 24 to the connector 14, and back-scattered light from the fiber to be tested is coupled via the fiber 24, the coupler 12, and an optical fiber 26 to the detector 16. The detector 16 produces from the detected light an electrical signal which is supplied to the signal processor 18 and is processed in known manner to produce a desired output, typically in the form of a graphical display of fiber attenuation versus distance along the fiber, on the display 20. FIG. 1 also shows an optical fiber 28 to be tested connected to the connector 14.

As already explained, if the fiber 28 to be tested is a single mode fiber, then to avoid excessive light attenuation or loss at least the fibers 22 and 24 must be single mode fibers, so that there is no coupling of light from a multi-mode fiber to a single mode fiber. Conversely, if the fiber 28 to be tested is a multi-mode fiber, then to avoid excessive light attenuation or loss at least the fibers 24 and 26 must be multi-mode fibers, again so that there is no coupling of light from a multi-mode fiber to a single mode fiber. These requirements have necessitated the use of different OTDRs, or at least different optical units in an OTDR, for testing single mode and multi-mode fibers.

FIG. 2 illustrates an OTDR in accordance with this invention, in which the optical source 10, optical detector 16, signal processor 18, and display 20 can be the same as in the OTDR of FIG. 1 and as well known in the art. The OTDR of FIG. 2 also includes an optical switch 30, two optical couplers 32 and 34, and two optical fiber connectors 36 and 38. The OTDR of FIG. 2 also includes single mode fibers 40, 42, and 44 respectively for coupling light from the optical source 10 to the optical switch 30, from the optical switch 30 to the optical coupler 32, and in both directions between the optical coupler 32 and the fiber connector 36. In addition, the OTDR of FIG. 2 includes multi-mode fibers 46, 48, and 50 respectively for coupling light from the optical switch 30 to the detector 16, from the optical coupler 34 to the optical switch 30, and in both directions between the optical coupler 34 and the fiber connector 38. Furthermore, the OTDR of FIG. 2 includes a fiber 52 for coupling light from the optical coupler 32 to the optical switch 30, and a fiber 54 for coupling light from the optical switch 30 to the optical coupler 34. The fibers 52 and 54 can each be either single mode or multi-mode fibers; in the following description they are assumed to be multi-mode fibers.

The OTDR of FIG. 2 can be used for testing either single mode or multi-mode fibers. To test a single mode fiber, this is connected to the connector 36, and the optical switch 30 is arranged as described below to couple light from the fiber 40 to the fiber 42 and from the fiber 52 to the fiber 46. There is thus a single mode fiber path from the optical source 10 to the single mode fiber via the optical switch 30, optical coupler 32, and connector 36, and a combined (initially single mode and subsequently multi-mode) fiber path back from the single mode fiber to be tested to the detector 16 via the connector 36, optical coupler 32, and optical switch 30. In these paths there is no coupling of light from a multi-mode fiber to a single mode fiber, and hence no excessive light loss as would be associated with such a coupling.

To test a multi-mode fiber, this is connected to the connector 38, and the optical switch 30 is arranged as described below to couple light from the fiber 40 to the fiber 54 and from the fiber 48 to the fiber 46. There is thus a combined (initially single mode and subsequently multi-mode) fiber path from the optical source 10 to the multi-mode fiber via the optical switch 30, optical coupler 34, and connector 38, and a multi-mode fiber path back from the multi-mode fiber to be tested to the detector 16 via the connector 38, optical coupler 34, and optical switch 30. Again, in these paths there is no coupling of light from a multi-mode fiber to a single mode fiber, and hence no excessive light loss as would be associated with such a coupling.

FIGS. 3 to 5 illustrate a preferred form of the optical switch 30. As illustrated in these figures, the switch is a rotary mechanical 2-pole 2-way switch comprising two cylindrical ceramic ferrules 56 and 58 which abut one another and are rotatable relative to one another, through an angle of 90°, within a split cylindrical metal sleeve 60. The ends of the fibers 42, 48, 52, and 54 are tightly packed and cemented within a bore of the ferrule 58, in the arrangement as shown in FIG. 5 with the fibers 42 and 52 diagonally opposite one another. Similarly, the ends of the fibers 40 and 46, and two dummy fiber stubs 62, are tightly packed and cemented within a bore of the ferrule 56, in the arrangement as shown in FIG. 4 with the fibers 40 and 46 diagonally opposite one another. The abutting ends of the ferrules 56 and 58, at which the fibers terminate, are polished, and the tolerances of the components are made sufficiently precise to ensure alignment and good optical coupling of the fibers 40 and 46 with the fibers 42 and 52 respectively in one position of the switch and with the fibers 54 and 48 respectively in another position of the switch, these two positions of the switch differing from one another by a rotational angle of 90°.

The optical switch 30 as described above is similar in some respects to a switch known from a poster paper entitled "WM4 A 0.3-dB single mode fiber switch" by Harold A. Roberts and Robert A. Eno, Optical Fiber Conference, 1990. However, in the optical switch 30 there is a mixture of single mode fibers, multi-mode fibers, and dummy fiber stubs. This is represented in FIGS. 4 and 5 in that the single mode fibers 40 and 42 are shown with small (9 $\mu$m) cores, the multi-mode fibers 48, 52, and 54 are shown with large (50 to 100 $\mu$m) cores, and the dummy fiber stubs 62 are shown without cores. As already mentioned, one or both of the fibers 52 and 54 can instead be single mode fibers.

It is observed that, although the fibers have different core sizes, they have a common external diameter so that they are relatively easily arranged in the manner described above and illustrated in FIGS. 4 and 5. Similarly, the connectors 36 and 38 for the two types of fiber, single mode and multi-mode, are similar to one another and to the connector 14; they merely differ in that they are used for connection of the fibers of the different types.

The optical coupler 34 can, like the optical coupler 12 of the known form of OTDR, simply be a multi-mode fiber fused 3 dB coupler if the fiber 54 is a multi-mode fiber as is assumed here. Fused couplers are well known in the art and need not be described further here. Similarly, if the fiber 52 is a single mode fiber, then the optical coupler 32 can be a single mode fiber 3 dB fused coupler. However, where as is assumed here the fiber 52 is a multi-mode fiber so that the optical coupler 32 must couple light between different types of fiber, then a different form of coupler, as described below with reference to FIG. 6, is used. A coupler similar to that shown in FIG. 6 can also be used for the optical coupler 34 if the fiber 54 is a single mode fiber.

Referring to FIG. 6, the optical coupler 32 comprises two graded index lenses 64 and 66 which are aligned with one another on a common axis 68 and have a half-mirror 70 therebetween. The fibers 42 and 44 terminate at opposite off-axis positions at the outer end of the lens 64, and the fiber 52 terminates at a similar off-axis position at the outer end of the lens 66, so that light from the single mode fiber 42 is reflected from the half-mirror 70 and focused by the lens 64 onto the single mode fiber 44, and light from the fiber 44 is transmitted by the half-mirror 70 and focused by the lens 66 onto the multi-mode fiber 52, as shown by lines 72 indicating optical paths. This optical coupler is similar to a wavelength division multiplexer as described with reference to FIG. 1 of Tohme U.S. Pat. No. 4,932,742 issued Jun. 12, 1990 and entitled "Fiber Optic Wavelength Division Multiplexing Module", except that it uses the half-mirror 70 in place of a dichroic filter which is used in this reference.

Although the above description refers specifically to single mode and multi-mode fibers, the same principles apply to fibers with any core diameters which differ from one another, for example to multi-mode fibers with different core diameters of 50 $\mu$m and 62.5 $\mu$m. Accordingly, all of the specific references above to single mode fiber can equally apply to fiber having a first core diameter, and all of the specific references above to multi-mode fiber can equally apply to fiber having a second core diameter greater than the first core diameter.

Furthermore, although the above description refers only to two optical fiber connectors 36 and 38, a greater number of connectors for fibers with more than two different core diameters could be provided in a similar manner, with a corresponding increase in the number of positions which the optical switch provides (e.g. for 3 connectors the optical switch would have 3 positions, with 4 dummy fiber stubs 62, thereby becoming a 2-pole 3-way switch) and a corresponding increase in the number of optical couplers such as the couplers 32 and 34.

Numerous other modifications, variations, and adaptations may be made to the particular embodiments of the invention described above without departing from the scope of the invention as defined in the claims.

What is claimed is:

1. An optical time domain reflectometer (OTDR) for selectively testing single mode or multi-mode optical fibers, including an optical source (10) and an optical detector (16), the OTDR comprising:
    a first, single mode, fiber (40) coupled to the optical source;
    a second, multi-mode, fiber (46) coupled to the optical detector;
    a first connector (36), for connection of a single mode optical fiber to be tested, having a third, single mode fiber (44) coupled thereto;
    a second connector (38), for connection of a multi-mode optical fiber to be tested, having a fourth, multi-mode fiber (50) coupled thereto; and
    means (30, 32, 34) for selectively coupling the third or the fourth fiber to both of the first and second fibers.

2. An OTDR as claimed in claim 1 wherein the means for selectively coupling the third or the fourth fiber to both of the first and second fibers comprises:
    a first optical coupler (32) coupling both a fifth, single mode, fiber (42) and a sixth optical fiber (52) to the third fiber (44);
    a second optical coupler (34) coupling both a seventh optical fiber (54) and an eighth, multi-mode, fiber (48) to the fourth fiber (50); and
    an optical switch (30) for selectively coupling either the first fiber (40) to the fifth fiber (42) and the second fiber (46) to the sixth fiber (52), or the first fiber (40) to the seventh fiber (54) and the second fiber (46) to the eighth fiber (48).

3. An OTDR as claimed in claim 2 wherein the sixth fiber (52) comprises a single mode fiber and the first optical coupler (32) comprises a fused fiber coupler.

4. An OTDR as claimed in claim 2 wherein the seventh fiber (54) comprises a multi-mode fiber and the second optical coupler (34) comprises a fused fiber coupler.

5. An OTDR as claimed in claim 2 wherein the first or second optical coupler (32 or 34) comprises two graded index lenses (64, 66) aligned with one another on a common axis (68) and a half-mirror (70) therebetween, the graded index lenses focussing light reflected by the half-mirror between two off-axis fibers (42, 44) at an outer end of one lens (64) and focussing light transmitted by the half-mirror between one of the two off-axis fibers (44) and another off-axis fiber (52) at an outer end of the other of the two graded index lenses (66).

6. An OTDR as claimed in claim 2 wherein the optical switch (30) comprises a first ferrule (58) having the fifth to eighth fibers therein and a second ferrule (56) having the first and second fibers therein, the ferrules being coaxially aligned and rotatable with respect to one another to provide the selective coupling of the fibers.

7. An optical time domain reflectometer (OTDR) for selectively testing optical fibers with different core diameters, comprising:
    an optical source, an optical detector, and two optical fiber connectors respectively for connection of a fiber having a first core diameter or a fiber having a second core diameter, the second core diameter being greater than the first core diameter; and
    optical paths selectively coupling either the optical source to the first connector and the first connector to the optical detector, or the optical source to the second connector and the second connector to the optical detector;
    wherein the optical path from the optical source to the first connector consists of optical fiber having the first core diameter, the optical path from the second connector to the optical detector consists of optical fiber having the second core diameter, and the optical paths from the first connector to the optical detector and from the optical source to the second connector each consist of optical fiber having the first core diameter followed by optical fiber having the second core diameter.

8. An OTDR as claimed in claim 7 wherein the optical paths comprise an optical switch for selectively coupling the optical source and the optical detector to either a first optical coupler coupled via an optical fiber having the first core diameter to the first connector or a second optical coupler coupled via an optical fiber having the second core diameter to the second connector.

9. An OTDR as claimed in claim 8 wherein each optical fiber having the first core diameter comprises a single mode optical fiber having a core diameter of about 9 μm.

10. An OTDR as claimed in claim 9 wherein each optical fiber having the second core diameter comprises a multi-mode optical fiber having a core diameter of at least about 50 μm.

11. A method of using an optical time domain reflectometer (OTDR) for selectively testing single mode or multi-mode optical fibers, comprising the steps of:
    connecting either a single mode fiber to be tested to a first connector or a multi-mode fiber to be tested to a second connector; and
    selectively coupling an optical source and an optical detector to the first connector or the second connector respectively;
    wherein the selective coupling of the optical source to the first connector is via single-mode optical fiber, the selective coupling of the second connector to the optical detector is via multi-mode optical fiber, and the selective coupling of the first connector to the optical detector or the optical source to the second connector is via single mode optical fiber followed by multi-mode optical fiber.

* * * * *